United States Patent
Pakiteeri et al.

(10) Patent No.: US 11,983,161 B2
(45) Date of Patent: May 14, 2024

(54) SYSTEM FOR MITIGATING DATA LOSS IN AN EDGE COMPUTING ENVIRONMENT USING MACHINE LEARNING AND DISTRIBUTED LEDGER TECHNIQUES

(71) Applicant: BANK OF AMERICA CORPORATION, Charlotte, NC (US)

(72) Inventors: Varun Sasi Pakiteeri, Kerala (IN); Raja Arumugam Maharaja, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 149 days.

(21) Appl. No.: 17/355,643

(22) Filed: Jun. 23, 2021

(65) Prior Publication Data
US 2022/0414084 A1    Dec. 29, 2022

(51) Int. Cl.
*G06F 16/23*    (2019.01)
*G06N 20/00*    (2019.01)
*H04L 9/00*    (2022.01)

(52) U.S. Cl.
CPC ...... *G06F 16/2365* (2019.01); *G06F 16/2379* (2019.01); *G06N 20/00* (2019.01); *H04L 9/50* (2022.05)

(58) Field of Classification Search
CPC ............. G06F 16/2365; G06F 16/2379; G06F 16/215; G06F 11/0793; G06F 16/2246; H04L 9/50; G06N 20/00
See application file for complete search history.

(56) References Cited

U.S. PATENT DOCUMENTS 10,614,253 B2    4/2020    Vieyra
10,637,644 B1    4/2020    Walters et al.
(Continued)

FOREIGN PATENT DOCUMENTS

CN    110232473 A    *    9/2019    ......... G06F 16/9536

OTHER PUBLICATIONS

Wanyaga, Felister, Joyce Gikandi, and Peter Ndirangu. Dark data: Business Analytical tools and Facilities for illuminating dark data. Lap Lambert Academic Publishing, 2017. (Year: 2017).*
(Continued)

*Primary Examiner* — Dennis Truong
(74) *Attorney, Agent, or Firm* — Moore & Van Allen PLLC; Anup Shrinivasan Iyer

(57) ABSTRACT

Systems, computer program products, and methods are described herein for mitigating data loss in an edge computing environment using machine learning and distributed ledger techniques. The present invention is configured to receive an indication that one or more edge computing nodes is processing one or more portions of a transaction; retrieve dark data associated with each of the one or more edge computing nodes; initiate a machine learning algorithm on the dark data retrieved from each of the one or more edge computing nodes; capture, using the machine learning algorithm, representation information for each of the one or more edge computing nodes from their respective dark data; generate a ledger record for the representation information for each of the one or more edge computing nodes; and register the ledger record for the representation information for each of the one or more edge computing nodes on a first distributed ledger.

20 Claims, 4 Drawing Sheets

(56) References Cited

U.S. PATENT DOCUMENTS

| | | | |
|---|---|---|---|
| 10,693,957 B2 | 6/2020 | Xie et al. | |
| 10,699,574 B1 | 6/2020 | Zeryihun et al. | |
| 10,726,343 B2* | 7/2020 | Saxena | G06N 5/04 |
| 10,740,325 B2 | 8/2020 | Xie et al. | |
| 10,764,258 B2 | 9/2020 | Gleichauf | |
| 10,826,709 B1 | 11/2020 | Zhuo | |
| 10,855,758 B1 | 12/2020 | OConnell et al. | |
| 10,917,231 B2 | 2/2021 | Yang | |
| 10,922,195 B2 | 2/2021 | Yang | |
| 10,938,750 B2 | 3/2021 | Yang | |
| 11,676,070 B1* | 6/2023 | Snyder | G06Q 30/0201 706/11 |
| 2015/0356431 A1* | 12/2015 | Saxena | G06N 5/04 706/46 |
| 2015/0363414 A1* | 12/2015 | Acharyya | G06F 11/1464 707/821 |
| 2016/0028761 A1* | 1/2016 | Sitsky | G06F 21/562 726/23 |
| 2016/0140150 A1* | 5/2016 | DeLuca | G06F 9/542 707/754 |
| 2017/0250972 A1* | 8/2017 | Ronda | H04L 9/0891 |
| 2017/0279774 A1* | 9/2017 | Booz | G06Q 20/0658 |
| 2017/0337534 A1 | 11/2017 | Goeringer et al. | |
| 2018/0129954 A1* | 5/2018 | Saxena | G06F 16/9024 |
| 2018/0129956 A1* | 5/2018 | Saxena | G06N 5/02 |
| 2018/0232657 A1* | 8/2018 | Acharya | G06Q 10/10 |
| 2018/0232659 A1* | 8/2018 | Ranatunga | G06Q 30/0241 |
| 2019/0013933 A1 | 1/2019 | Mercuri et al. | |
| 2019/0042988 A1* | 2/2019 | Brown | G06N 5/022 |
| 2019/0139136 A1 | 5/2019 | Molinari et al. | |
| 2019/0280870 A1 | 9/2019 | Subramanian | |
| 2019/0287099 A1 | 9/2019 | Tan | |
| 2019/0324995 A1* | 10/2019 | Jakobsson | G06F 16/953 |
| 2019/0363938 A1 | 11/2019 | Liebinger Portela et al. | |
| 2019/0379699 A1* | 12/2019 | Katragadda | H04L 63/1425 |
| 2020/0013118 A1* | 1/2020 | Treat | G06Q 20/383 |
| 2020/0076828 A1* | 3/2020 | Nainar | H04L 9/3263 |
| 2020/0134579 A1* | 4/2020 | Almukaynizi | G06N 7/01 |
| 2020/0199671 A1* | 6/2020 | Pan | C12N 15/1093 |
| 2020/0201560 A1 | 6/2020 | Yang et al. | |
| 2020/0201827 A1* | 6/2020 | Chacko | H03M 13/373 |
| 2020/0202336 A1 | 6/2020 | Walters et al. | |
| 2020/0204560 A1 | 6/2020 | Yang | |
| 2020/0279041 A1* | 9/2020 | Endler | G06F 21/31 |
| 2020/0379974 A1* | 12/2020 | Stennett | G06F 16/2228 |
| 2020/0410304 A1* | 12/2020 | Zhou | G06F 17/16 |
| 2021/0042767 A1* | 2/2021 | Guan | G06Q 30/0255 |
| 2021/0073913 A1* | 3/2021 | Ingargiola | G06F 21/64 |
| 2021/0357527 A1* | 11/2021 | Maeng | G06N 20/00 |
| 2021/0377310 A1* | 12/2021 | Fernando | G06N 3/006 |
| 2021/0383395 A1* | 12/2021 | Galka | G06Q 20/389 |
| 2022/0027900 A1* | 1/2022 | Suh | G06Q 20/4016 |
| 2022/0138271 A1* | 5/2022 | Suh | G06F 16/951 707/709 |

OTHER PUBLICATIONS

Pahwa, Payal. "Dark Data Analytics Using Blockchain Technology." Advances in Data Sciences, Security and Applications. Springer, Singapore, 2020. 467-474. (Year: 2020).*

G. Gimpel and A. Alter, "Benefit From the Internet of Things Right Now by Accessing Dark Data," in IT Professional, vol. 23, No. 2, pp. 45-49, Mar.-Apr. 1, 2021, doi: 10.1109/MITP.2020.3025483. (Year: 2021).*

* cited by examiner

US 11,983,161 B2

SYSTEM FOR MITIGATING DATA LOSS IN AN EDGE COMPUTING ENVIRONMENT USING MACHINE LEARNING AND DISTRIBUTED LEDGER TECHNIQUES

FIELD OF THE INVENTION

The present invention embraces a system for mitigating data loss in an edge computing environment using machine learning and distributed ledger techniques.

BACKGROUND

When an edge computing node processes a transaction (or a portion of the transaction), it may gather data elements (dark data) as part of the processing that are not used for processing. Once the transaction (or portions of the transaction) is processed, these data elements remain in the data repositories of the edge computing nodes. Therefore, it is not uncommon for each edge computing node to be associated with data elements that involve critical and business data and data elements that involve dark data when processing a transaction.

Therefore, there a need for a system that leverages machine learning and distributed ledger techniques to analyze the dark data and mitigate data loss.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for mitigating data loss in an edge computing environment using machine learning and distributed ledger techniques is presented The system comprising: at least one non-transitory storage device; and at least one processing device coupled to the at least one non-transitory storage device, wherein the at least one processing device is configured to: electronically receive an indication that one or more edge computing nodes is processing one or more portions of a transaction; retrieve dark data associated with each of the one or more edge computing nodes; initiate a machine learning algorithm on the dark data retrieved from each of the one or more edge computing nodes; capture, using the machine learning algorithm, representation information for each of the one or more edge computing nodes from their respective dark data; generate a ledger record for the representation information for each of the one or more edge computing nodes; and register the ledger record for the representation information for each of the one or more edge computing nodes on a first distributed ledger.

In some embodiments, the representation information comprises at least textual, structural, tabular, and/or visual expressions associated with the dark data.

In some embodiments, the at least one processing device is further configured to: determine duplicate data elements in the representation information for each of the one or more edge computing nodes; and reconcile the representation information for each of the one or more edge computing nodes, wherein reconciling comprises at least removing the duplicate data elements; and generate an identification tag for the representation information for each of the one or more edge computing nodes after reconciliation.

In some embodiments, the at least one processing device is further configured to: map the identification tag for the representation information with the generated ledger record for the representation information.

In some embodiments, the at least one processing device is further configured to: receive, from a computing device of a user, a request to process the transaction; and transmit, using an edge computing engine, the transaction to the one or more edge computing nodes for processing.

In some embodiments, transmitting the transaction to the one or more edge computing nodes further comprises: splitting the transaction into the one or more portions; and transmitting the one or more portions of the transactions to the one or more edge computing nodes for processing.

In some embodiments, the at least one processing device is further configured to: generate a ledger record for each of the one or more portions of the transaction; and register the ledger record for each of the one or more portions of the transaction on a second distributed ledger.

In some embodiments, the at least one processing device is further configured to: generate an identification tag for each of the one or more portions of the transaction; and map the identification tag for each of the one or more portions of the transaction with the generated ledger record for each of the one or more portions of the transaction.

In some embodiments, the at least one processing device is further configured to: receive, from the one or more edge computing nodes, one or more processed portions of the transaction; generate a ledger record for each of the one or more processed portions of the transaction; and register the ledger record for each of the one or more processed portions of the transaction with the second distributed ledger.

In some embodiments, the at least one processing device is further configured to: generate an identification tag for each of the one or more processed portions of the transaction; and map the identification tag for each of the one or more processed portions of the transaction with the generated ledger record for each of the one or more processed portions of the transaction.

In some embodiments, the at least one processing device is further configured to: transmit the ledger record for each of the one or more processed portions of the transaction to the computing device of the user for verification.

In some embodiments, the at least one processing device is further configured to: receive, from the computing device of the user, a verification acknowledgement for the ledger record for each of the one or more processed portions of the transaction; and register the verified ledger record for each of the one or more processed portions of the transactions in the second distributed ledger.

In another aspect, a computer program product for mitigating data loss in an edge computing environment using machine learning and distributed ledger techniques is presented. The computer program product comprising a non-transitory computer-readable medium comprising code causing a first apparatus to: electronically receive an indication that one or more edge computing nodes is processing one or more portions of a transaction; retrieve dark data associated with each of the one or more edge computing nodes; initiate a machine learning algorithm on the dark data retrieved from each of the one or more edge computing nodes; capture, using the machine learning algorithm, representation information for each of the one or more edge computing nodes from their respective dark data; generate a ledger record for the representation information for each of the one or more edge computing nodes; and register the ledger record for the representation information for each of the one or more edge computing nodes on a first distributed ledger.

In yet another aspect, a method for mitigating data loss in an edge computing environment using machine learning and distributed ledger techniques is presented. The method comprising: electronically receiving an indication that one or more edge computing nodes is processing one or more portions of a transaction; retrieving dark data associated with each of the one or more edge computing nodes; initiating a machine learning algorithm on the dark data retrieved from each of the one or more edge computing nodes; capturing, using the machine learning algorithm, representation information for each of the one or more edge computing nodes from their respective dark data; generating a ledger record for the representation information for each of the one or more edge computing nodes; and registering the ledger record for the representation information for each of the one or more edge computing nodes on a first distributed ledger.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
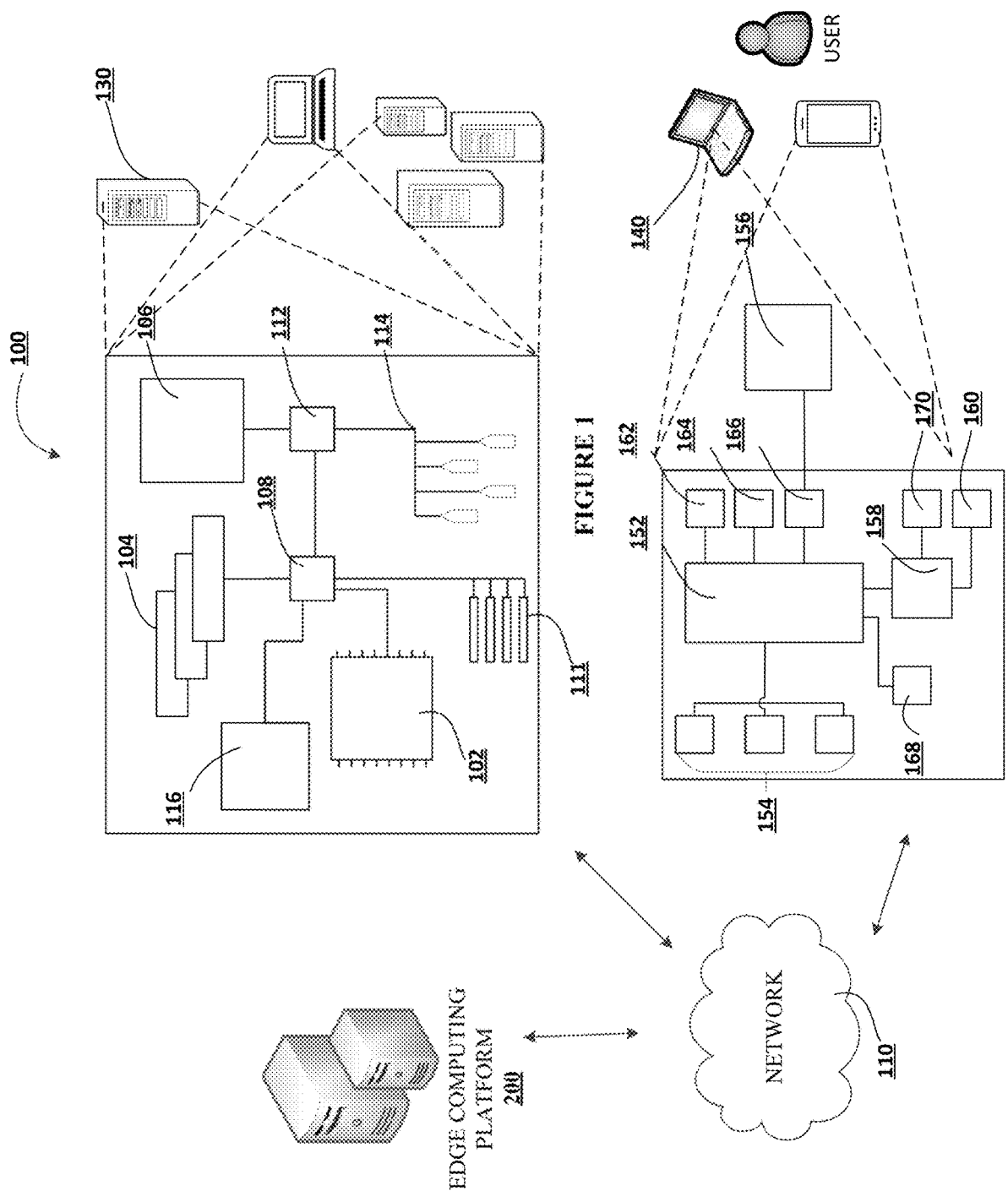
Figure 2:
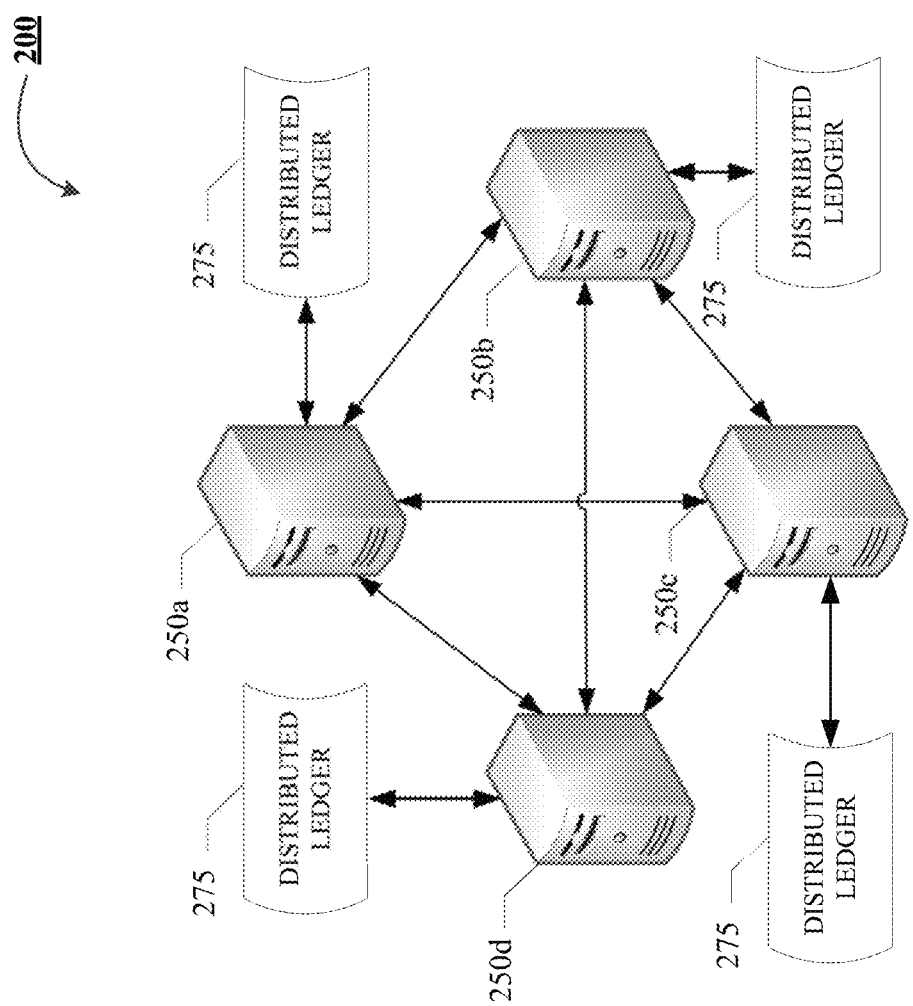
Figure 3:
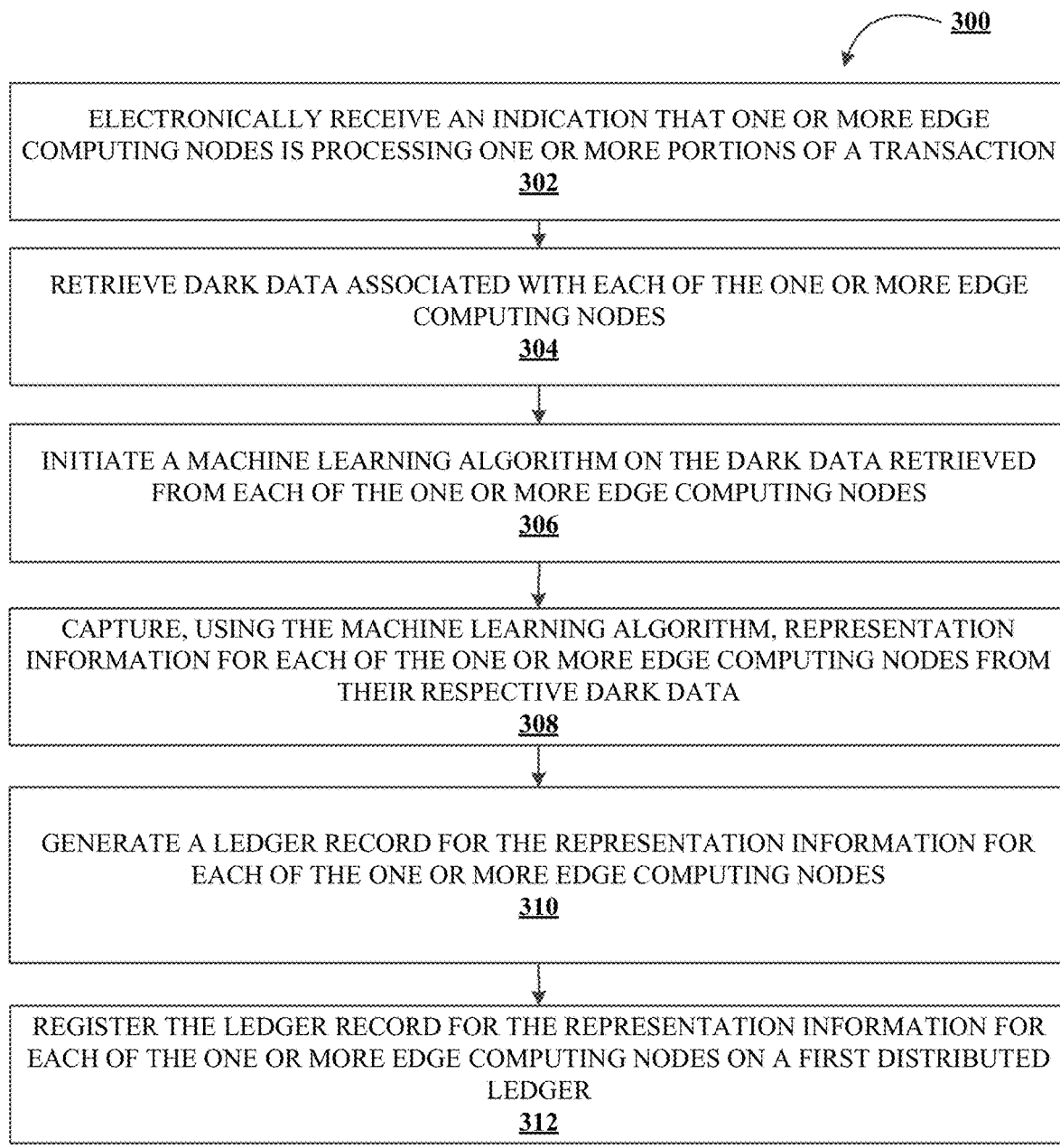
Figure 4:
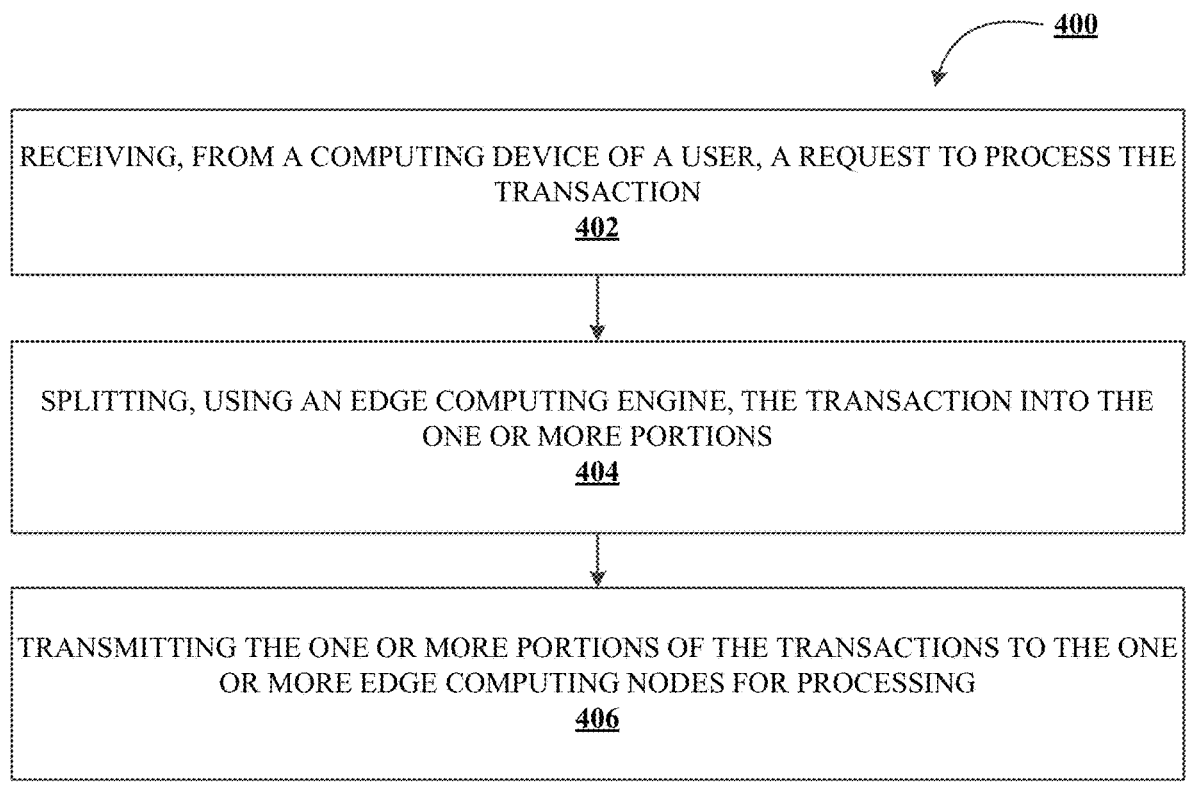

Having thus described embodiments of the invention in general terms, reference will now be made the accompanying drawings, wherein:

FIG. 1 illustrates technical components of a system for mitigating data loss in an edge computing environment using machine learning and distributed ledger techniques, in accordance with an embodiment of the invention;

FIG. 2 illustrates an edge computing platform, in accordance with an embodiment of the invention;

FIG. 3 illustrates a process flow for mitigating data loss in an edge computing environment using machine learning and distributed ledger techniques, in accordance with an embodiment of the invention; and FIG. 4 illustrates a process flow for enabling a parallel processing platform using edge computing, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

As used herein, a "distributed ledger" is a type of distributed ledger technology within a distributed trust computing network storing a link of ledger records (e.g., blocks) to secure and validate distributed consensus. A distributed ledger is distributed across and managed by peer-to-peer networks. Since it is a distributed ledger, it can exist without a centralized authority or server managing it, and its data quality can be maintained by database replication and computational trust. However, the structure of the distributed ledger makes it distinct from other kinds of distributed ledgers. Data on a distributed ledger is grouped together and organized in ledger records. The ledger records are then linked to one another and secured using cryptography. A distributed ledger provides numerous advantages over traditional databases. A large number of computing devices with access to a distributed ledger may reach a consensus regarding the validity of a transaction contained on the transaction ledger. Thus, a "valid" transaction is one that can be validated based on a set of rules that are defined by the particular system implementing the distributed ledger. The append-only structure of distributed ledgers only allows data to be added to the database: altering or deleting previously entered data on earlier ledger records is impossible. Distributed ledger technology is therefore well-suited for recording events, managing records, processing transactions, and tracing resources.

Data can be broadly classified into three areas: (i) critical and business data—data that is needed and used to power the operation of the entity, ensure that goals are met, and allows the entity to grow year on year, (ii) redundant obsolete and trivial (ROT) data—data that is not used in regular processing and has lesser importance than the critical business data to the entity or its need for data, and (iii) dark data—data that is below the surface, hiding within the technical infrastructure (computing devices, internal network, or the like) and can hold a huge amount of relevant information.

When an edge computing node processes a transaction (or a portion of the transaction), it may gather data elements (dark data) as part of the processing that are not used for processing. Once the transaction (or portions of the transaction) is processed, these data elements remain in the data repositories of the edge computing nodes. Therefore, it is not uncommon for each edge computing node to be associated with data elements that involve critical and business data and data elements that involve dark data when processing a transaction. To analyze the dark data, the present invention employs machine learning techniques to retrieve representation information such as textual, structural, tabular, and/or visual expressions associated with the dark data. This representation information is then reviewed by the user to determine whether there is useful information that can be moved to be part of critical and business data. In addition, the present invention provides the functional benefit of leveraging the distributed ledger technology to track, (i) the transaction processed by each edge computing node, and (ii) the representation information retrieved from each edge computing node. In doing so, the present invention generates an identification tag for each transaction portion executed by an edge computing node and an identification tag for representation information extracted from dark data retrieved from the same edge computing node. In this way, the present invention may create a relationship between the representation information and the portion of transaction processed by the edge computing node based on their respective identification tags.

Furthermore, depending on the transaction and the way the transaction is processed in the edge computing platform, the data repositories of some edge computing nodes involved may have duplicate data elements. Since these data elements are rarely processed, the data duplicates remain in the data repositories until they are eventually deleted. The representation information retrieved by from the dark data is reconciled to remove data duplicates before being registered with the distributed ledger.

FIG. 1 presents an exemplary block diagram of the system environment for mitigating data loss in an edge computing environment using machine learning and distributed ledger techniques 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, an edge computing platform 200, and a user input system 140. In some embodiments, the system 130, the edge computing platform 200, and the user input system 140 may be used to implement the processes described herein, in accordance with an embodiment of the present invention. In this regard, the system 130, the edge computing platform 200, and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. In accordance with embodiments of the invention, the edge computing platform 200 is intended to represent an interconnected network of edge computing nodes operatively connected to each other, and configured to transmit and/or receive data transmissions from the system 130 and/or the user input system 140 via the network 110. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130, the edge computing platform 200, and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. Similarly, the edge computing platform 200 and the system 130 may have a client-server relationship where the system 130 makes a service request (e.g., process a transaction) to the edge computing platform 200 by splitting the transaction into multiple portions and assigning each edge computing node a specific portion for processing, each edge computing node processes its respective portion and transmits the processed portion back to the system 130. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates an edge computing platform 200, in accordance with an embodiment of the invention. As described above and referring to FIG. 2, a distributed ledger 275 (e.g., second distributed ledger) is maintained across several edge computing nodes (devices) 250a, 250b, 250c, and 250d. Edge computing is a distributed computing topology that brings computation and data storage closer to the devices (e.g., edge computing nodes 250a-d) where it's being gathered, rather than relying on a central location (e.g., system 130). The distributed nature of edge computing allows for information processing to be performed in parallel where each edge computing node that is part of the edge computing platform handles separate parts of the overall transaction. Breaking up different parts of a transaction among multiple edge computing nodes will help reduce the amount of time to run process the task. Accordingly, each edge computing node receives a portion of a transaction for processing from the system (e.g., system 130).

Each edge computing node may have a complete or partial copy of the second distributed ledger 275 which registers any portion of the transaction communicated to any of the edge computing nodes 250a-d is recorded in the second distributed ledger 275. Once the edge computing nodes 250a-d complete processing their respective portion of the transaction, the processed portions are transmitted back to the system. These processed portions are communicated from the edge computing nodes 250a-d back to the system is also recorded in the second distributed ledger 275. As described further detail herein, any of these edge computing nodes can validate the portion of the transaction transmitted and/or processed, add the portion of the transaction transmitted and/or processed to its copy of the second distributed ledger 275, and/or broadcast its validation and/or other data to other edge computing nodes 250a-d. These portions of the transaction transmitted and/or processed by each edge computing node 250a-d on the second distributed ledger 275 are then grouped together and organized in ledger records. These ledger records are then linked to one another, time-stamped, and secured using cryptography.

FIG. 3 illustrates a process flow for mitigating data loss in an edge computing environment using machine learning and distributed ledger techniques 200, in accordance with an embodiment of the invention. As shown in block 302, the process flow includes electronically receiving an indication that one or more edge computing nodes is processing one or more portions of a transaction. As described in further detail herein, each edge computing node is configured to process different portions of the transaction simultaneously by dividing the transaction into smaller parts. Next, as shown in block 304, the process flow includes retrieving dark data associated with each of the one or more edge computing nodes.

Next, as shown in block 306, the process flow includes initiating a machine learning algorithm on the dark data retrieved from each of the one or more edge computing nodes. Machine learning is an application of artificial intelligence (AI) that provides systems with the ability to automatically learn and accomplish the equivalent of continuously running programs in a fraction of the time. Entities can utilize machine learning to build models that work in the specific business function and industry. In the case of dark data, the process of learning may begin with the data elements, in order to look for patterns and make better decisions in the future based on previous examples. Accordingly, by implementing machine learning algorithms (e.g., unsupervised algorithms), the system may be configured to identify unknown patterns in the unstructured dark data, including specific features that may be useful for categorization.

Next, as shown in block 308, the process flow includes capturing, using the machine learning algorithm, representation information for each of the one or more edge computing nodes from their respective dark data. In some embodiments, the representation information (e.g., features, patterns, and/or the like) may include at least textual, structural, tabular, and/or visual expressions associated with the dark data.

Next, as shown in block 310, the process flow includes generating a ledger record (e.g., block) for the representation information for each of the one or more edge computing nodes. In some embodiments, the system may be configured to generate the ledger record at each edge computing node. In this regard, the system may be configured to transmit control signals configured to trigger specialized software/equipment at each edge computing node to create a ledger record for the representation information. Each ledger record may include at least a cryptographic hash of the portion of the transaction processed by that edge computing node.

Next, as shown in block 312, the process flow includes registering the ledger record for the representation information for each of the one or more edge computing nodes on a first distributed ledger. For a transaction to be registered in the first distributed ledger, it must be verified by one or more validation nodes. In some embodiments, the one or more validation nodes may be responsible for verifying transactions before registering the transaction in the distributed ledger based on one or more logic and rules associated with the first distributed ledger. As described herein, the edge computing nodes may perform the functions of validation nodes and may verify the ledger record created and submitted by any of the edge computing nodes in the common memory pool. By verifying each ledger record, the validation nodes may determine that the transaction is "valid." Once the validation nodes reach a consensus regarding the validity of the ledger record, the ledger record is then registered in the first distributed ledger.

In some embodiments, the system may be configured to determine duplicate data elements in the representation information for each of the one or more edge computing nodes. In response, the system may be configured to reconcile the representation information for each of the one or more edge computing nodes to remove the duplicate data elements. Once reconciled, the system may be configured to generate an identification tag for the representation information for each of the one or more edge computing nodes after reconciliation. Then, each identification tag for the representation information is mapped to the generated ledger record for the representation information.

FIG. 4 illustrates a process flow for enabling a parallel processing platform using edge computing 400, in accordance with an embodiment of the invention. As shown in block 402, the process flow includes receiving, from a computing device of a user, a request to process the transaction. In some embodiments, a transaction may refer to any task that may includes a sequence of information exchange and related work (e.g., database updating) that is treated as a unit for the purposes of satisfying a request and for ensuring data integrity.

Next, as shown in block 404, the process flow includes splitting, using an edge computing engine, the transaction into the one or more portions. Typically, when processing a transaction that has a heavy load or in a network having latency issues, there is a likelihood of incurring failure of process that may result in data loss. Splitting the transaction into manageable portions to be processed by edge computing nodes within an edge computing platform in parallel allows for reduced latency issues and faster processing times.

Next, as shown in block 406, the process flow includes transmitting the one or more portions of the transactions to the one or more edge computing nodes for processing. In some embodiments, the system may be configured to generate a ledger record for each of the one or more portions of the transaction. For each portion of the transaction being transmitted from the system to the edge computing node, the system may be configured to generate a ledger record. Similar to the ledger record generation and registration process described herein, the system may be configured to register the ledger record for each of the one or more portions of the transaction on a second distributed ledger. The second distributed ledger and the first distributed ledger may be independent from each other. In addition, the system may be configured to generate an identification tag for each of the one or more portions of the transaction. In response, the system may be configured to map the identification tag for each of the one or more portions of the transaction with the generated ledger record for each of the one or more portions of the transaction.

In some embodiments, the system may be configured to receive, from the one or more edge computing nodes, one or more processed portions of the transaction. In response, the system may be configured to generate a ledger record for each of the one or more processed portions of the transaction. Once generated, the system may be configured to register the ledger record for each of the one or more processed portions of the transaction with the second distributed ledger. In this way, the second distributed ledger may include a ledger record each time a portion of the transaction is transmitted to an edge computing node for processing and each time a processed portion of the transaction is received from the edge computing node post-processing. For each of the one or more processed portions of the transaction, the system may be configured to generate an identification tag. Once generated, the system may be configured to map the identification tag for each of the one or more processed portions of the transaction with the generated ledger record for each of the one or more processed portions of the transaction.

Each ledger record may then be verified by the user for its content. In this regard, the system may be configured to transmit the ledger record for each of the one or more processed portions of the transaction to the computing device of the user for verification. In response, the system may be configured to receive, from the computing device of the user, a verification acknowledgement for the ledger record for each of the one or more processed portions of the transaction. Once received, the system may be configured to register the verified ledger record for each of the one or more processed portions of the transactions in the second distributed ledger.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for mitigating data loss in an edge computing environment using machine learning and distributed ledger techniques, the system comprising:
   at least one non-transitory storage device; and
   at least one processing device coupled to the at least one non-transitory storage device, wherein the at least one processing device is configured to:
   electronically receive an indication that one or more edge computing nodes is processing one or more portions of a transaction, wherein each edge computing node is configured to process a portion of the transaction;
   retrieve dark data associated with each of the one or more edge computing nodes, wherein dark data comprises residual data elements stored in one or more data repositories of the one or more edge computing nodes after the one more edge computing nodes have processed a corresponding portion of one or more past transactions wherein the residual data elements were aggregated by the one or more edge computing nodes when processing the corresponding portion of the one or more past transactions but were not used to process the corresponding portion of the one or more past transactions;
   initiate a machine learning algorithm on the dark data retrieved from each of the one or more edge computing nodes;
   capture, using the machine learning algorithm, representation information for each of the one or more edge computing nodes from their respective dark data;
   generate a ledger record for the representation information for each of the one or more edge computing nodes;
   register the ledger record for the representation information for each of the one or more edge computing nodes on a first distributed ledger;
   generate an identification tag for each portion of the one or more past transactions; and
   map the identification tag for each portion of the one or more past transactions with the ledger record for the representation information for each corresponding edge computing node associated with processing said portion of the of the one or more past transactions.

2. The system of claim 1, wherein the representation information comprises at least textual, structural, tabular, and/or visual expressions associated with the dark data.

3. The system of claim 1, wherein the at least one processing device is further configured to:
   determine duplicate data elements in the representation information for each of the one or more edge computing nodes;
   reconcile the representation information for each of the one or more edge computing nodes, wherein reconciling comprises at least removing the duplicate data elements; and
   generate an identification tag for the representation information for each of the one or more edge computing nodes after reconciliation.

4. The system of claim 3, wherein the at least one processing device is further configured to:
   map the identification tag for the representation information with the generated ledger record for the representation information.

5. The system of claim 1, wherein the at least one processing device is further configured to:
   receive, from a computing device of a user, a request to process the transaction; and
   transmit, using an edge computing engine, the transaction to the one or more edge computing nodes for processing.

6. The system of claim 5, wherein transmitting the transaction to the one or more edge computing nodes further comprises:
   splitting the transaction into the one or more portions; and
   transmitting the one or more portions of the transactions to the one or more edge computing nodes for processing.

7. The system of claim 6, wherein the at least one processing device is further configured to:

generate a ledger record for each of the one or more portions of the transaction; and register the ledger record for each of the one or more portions of the transaction on a second distributed ledger.

8. The system of claim 7, wherein the at least one processing device is further configured to:

generate an identification tag for each of the one or more portions of the transaction; and map the identification tag for each of the one or more portions of the transaction with the generated ledger record for each of the one or more portions of the transaction.

9. The system of claim 8, wherein the at least one processing device is further configured to:

receive, from the one or more edge computing nodes, one or more processed portions of the transaction;

generate a ledger record for each of the one or more processed portions of the transaction; and register the ledger record for each of the one or more processed portions of the transaction with the second distributed ledger.

10. The system of claim 1, wherein the at least one processing device is further configured to:

generate an identification tag for each of the one or more processed portions of the transaction; and map the identification tag for each of the one or more processed portions of the transaction with the generated ledger record for each of the one or more processed portions of the transaction.

11. The system of claim 9, wherein the at least one processing device is further configured to:

transmit the ledger record for each of the one or more processed portions of the transaction to the computing device of the user for verification.

12. The system of claim 11, wherein the at least one processing device is further configured to:

receive, from the computing device of the user, a verification acknowledgement for the ledger record for each of the one or more processed portions of the transaction; and register the verified ledger record for each of the one or more processed portions of the transactions in the second distributed ledger.

13. A computer program product for mitigating data loss in an edge computing environment using machine learning and distributed ledger techniques, the computer program product comprising a non-transitory computer-readable medium comprising code causing a first apparatus to:

electronically receive an indication that one or more edge computing nodes is processing one or more portions of a transaction, wherein each edge computing node is configured to process a portion of the transaction;

retrieve dark data associated with each of the one or more edge computing nodes, wherein dark data comprises residual data elements stored in one or more data repositories of the one or more edge computing nodes after the one more edge computing nodes have processed a corresponding portion of one or more past transactions wherein the residual data elements were aggregated by the one or more edge computing nodes when processing the corresponding portion of the one or more past transactions but were not used to process the corresponding portion of the one or more past transactions;

initiate a machine learning algorithm on the dark data retrieved from each of the one or more edge computing nodes;

capture, using the machine learning algorithm, representation information for each of the one or more edge computing nodes from their respective dark data;

generate a ledger record for the representation information for each of the one or more edge computing nodes;

register the ledger record for the representation information for each of the one or more edge computing nodes on a first distributed ledger;

generate an identification tag for each portion of the one or more past transactions; and map the identification tag for each portion of the one or more past transactions with the ledger record for the representation information for each corresponding edge computing node associated with processing said portion of the of the one or more past transactions.

14. The computer program product of claim 13, wherein the representation information comprises at least textual, structural, tabular, and/or visual expressions associated with the dark data.

15. The computer program product of claim 13, wherein the non-transitory computer-readable medium comprising code causes the first apparatus to:

determine duplicate data elements in the representation information for each of the one or more edge computing nodes;

reconcile the representation information for each of the one or more edge computing nodes, wherein reconciling comprises at least removing the duplicate data elements; and generate an identification tag for the representation information for each of the one or more edge computing nodes after reconciliation.

16. The computer program product of claim 15, wherein the non-transitory computer-readable medium comprising code causes the first apparatus to:

map the identification tag for the representation information with the generated ledger record for the representation information.

17. The computer program product of claim 13, wherein the non-transitory computer-readable medium comprising code causes the first apparatus to:

receive, from a computing device of a user, a request to process the transaction; and transmit, using an edge computing engine, the transaction to the one or more edge computing nodes for processing.

18. The computer program product of claim 17, wherein transmitting the transaction to the one or more edge computing nodes further comprises:

splitting the transaction into the one or more portions; and transmitting the one or more portions of the transactions to the one or more edge computing nodes for processing.

19. The computer program product of claim 18, wherein the non-transitory computer-readable medium comprising code causes the first apparatus to:

generate a ledger record for each of the one or more portions of the transaction; and register the ledger record for each of the one or more portions of the transaction on a second distributed ledger.

20. A method for mitigating data loss in an edge computing environment using machine learning and distributed ledger techniques, the method comprising:

electronically receiving an indication that one or more edge computing nodes is processing one or more portions of a transaction, wherein each edge computing node is configured to process a portion of the transaction;

retrieving dark data associated with each of the one or more edge computing nodes, wherein dark data comprises residual data elements stored in one or more data repositories of the one or more edge computing nodes after the one more edge computing nodes have processed a corresponding portion of one or more past transactions wherein the residual data elements were aggregated by the one or more edge computing nodes when processing the corresponding portion of the one or more past transactions but were not used to process the corresponding portion of the one or more past transactions;

initiating a machine learning algorithm on the dark data retrieved from each of the one or more edge computing nodes;

capturing, using the machine learning algorithm, representation information for each of the one or more edge computing nodes from their respective dark data;

generating a ledger record for the representation information for each of the one or more edge computing nodes;

registering the ledger record for the representation information for each of the one or more edge computing nodes on a first distributed ledger;

generating an identification tag for each portion of the one or more past transactions; and mapping the identification tag for each portion of the one or more past transactions with the ledger record for the representation information for each corresponding edge computing node associated with processing said portion of the of the one or more past transactions.

* * * * *